United States Patent [19]

Yocom

[11] Patent Number: 6,099,754
[45] Date of Patent: Aug. 8, 2000

[54] LONG PERSISTENCE RED PHOSPHORS

[75] Inventor: Perry Niel Yocom, Princeton, N.J.

[73] Assignee: Sarnoff Corporation, Princeton, N.J.

[21] Appl. No.: 09/259,661

[22] Filed: Feb. 26, 1999

Related U.S. Application Data

[60] Provisional application No. 60/079,959, Mar. 31, 1998.
[51] Int. Cl.[7] .......................... C09K 11/71; C09K 11/59; C09K 11/55
[52] U.S. Cl. .............................. 252/301.4 F; 252/301.4 P
[58] Field of Search ...................... 252/301.4 R, 301.4 F, 252/301.4 P

[56] References Cited

U.S. PATENT DOCUMENTS

| | | | |
|---|---|---|---|
| 3,882,041 | 5/1975 | Royce | 252/301.4 |
| 5,043,096 | 8/1991 | Lindmayer | 252/301.4 |
| 5,367,176 | 11/1994 | Leblans et al. | 250/585 |
| 5,650,094 | 7/1997 | Royce et al. | 252/301.4 F |

OTHER PUBLICATIONS

Chemical Abstract citation 80:102,210; abstract for Japanese B4 patent JP48034115, published Oct. 18, 1973.

*Primary Examiner*—C. Melissa Koslow
*Attorney, Agent, or Firm*—William J. Burke

[57] ABSTRACT

Long persistence red phosphors of alkaline earth metal phosphates, alkaline earth magnesium silicates and alkaline earth magnesium di-silicates are doubly activated with europium and manganese and contain a trivalent or quadrivalent thermal trapping agent. The thermal trapping cation feeds thermal energy to the europium ion which in turn feeds the energy to the manganese ion that emits in the red region of the spectrum.

7 Claims, No Drawings

LONG PERSISTENCE RED PHOSPHORS

This application claims the benefit of Provisional application Ser. No. 60/079,958 filed Mar. 31, 1998.

This invention relates to long persistence red emitting phosphors. More particularly, this invention relates to strontium, barium, calcium or magnesium silicates and phosphates that are activated with both europium and manganese and include a trivalent or a quadrivalent rare earth cation.

BACKGROUND OF THE INVENTION

Long persistent red phosphors have been difficult to achieve. Alkaline earth sulfides such as SrS and (Zn,Cd)S:Cu are known. Lindmayer et al in U.S. Pat. No. 5,043,096 disclose that sulfides activated with lanthanum, europium and cerium are redemitting phosphors; however, they are readily decomposed when exposed to moisture. Further they are fluxed with oxides and a halide such as LiF. The fired phosphor was highly sintered and had to be ground to obtain a useful material. However, grinding degrades the emission, and even heating the ground phosphor did not fully restore its emission.

Royce et al, U.S. Pat. No. 5,650,094, disclose red phosphors of (Ca,Pr,M) titanates, wherein M is Zn and/or Mn. Although described as long emitting phosphors, the emission lasts only about 10 minutes.

The only way of obtaining long persistence red emitting materials that has been achieved so far is by filtering green emitting phosphors, such as Zn:Cu:(Co,Sr) or alkaline earth aluminates activated with europium and dysprosium. However, this method results in a decreased emission intensity.

Thus a search for long persistence, red emitting phosphors has continued.

SUMMARY OF THE INVENTION

The present red emitting, long persistent phosphors are based on incorporating a trivalent or quadrivalent cation that traps thermal energy and provides energy transfer to a divalent europium activator. This energy in turn is fed to a divalent manganese activator, which emits in the red spectral region. Suitable trivalent cations include dysprosium or neodymium; suitable quadrivalent cations include titanium or zirconium. Suitable phosphors of the invention are strontium phosphate, alkaline earth magnesium silicates or alkaline earth magnesium di-silicates doubly activated with europium and manganese and including a suitable trivalent or quadrivalent rare earth trapping cation.

DETAILED DESCRIPTION OF THE INVENTION

The environmentally stable, long persistence red phosphors of the invention operate by energy transfer from a trivalent or quadrivalent trap in the host phosphor material, such as dysprosium, neodymium, zirconium or titanium, which slowly feeds the divalent activator europium and in turn transfers energy to divalent manganese, which emits in the red.

Suitable host phosphors include $Sr_2P_2O_7$:Eu:Mn:Dy; $Ba_3MgSi_2O_8$:Eu:Mn:Dy; $(Ba,Sr,Ca)_3MgSi_2O_8$:Eu:Mn:Nd; and (Sr, Ba) $MgSiO_4$: Eu:Mn:Dy.

A suitable concentration of divalent europium is in the range of about 0.1 to 5.0 atom percent; that of divalent manganese is in the range of about 1 to 10 atom percent; and a suitable concentration of the trivalent or quadrivalent rare earths, such as dysprosium, neodymium, titanium or zirconium, is in the range of about 1 to 5 atom percent.

The trivalent or quadrivalent rare earth cation created trap slowly thermally empties, transferring its energy to light energy in the phosphor material. The result is a very long persistent red phosphor that can be used for various safety and decorative uses.

Red phosphors are highly desirable for safety signs in the event of a power failure, such as for "EXIT" signs, and other safety equipment such as fire extinguishers, fire axes, etc. In addition, novelty uses such as for toys, automobile hub caps, sporting goods and clothing are highly desirable because red is a pleasing color.

The phosphors can be made by firing the respective oxides or carbonates in their desired proportion, conveniently in a chloride and/or borate flux.

For example, a merwinite type silicate shows the desired energy transfer to obtain the desired red emission.

As an example, the following oxides and carbonates are mixed together; 42.22 parts by weight of $SrCO_3$; 4.0 parts by weight of MgO; 12.0 parts by weight of silica; 0.71 part by weight of $Eu_2O_3$; and 3.4 parts by weight of $MnCO_3$. Ammonium chloride (2.3 parts by weight) is added to serve as a flux, and the mixture is fired in an atmosphere of forming gas at a temperature range of about 1100 to 1300° C. The fired material is crushed and the flux removed by washing with water. The resultant compound has the formula $Sr_{2.86}Eu_{0.04}Mn_{0.10}MgSi_2O_8$.

A material which forms a trapping site is then added, such as one that includes a trivalent cation or a quadrivalent cation, to provide long persistence emission in the phosphor. Suitable trivalent rare earth cations include dysprosium (Dy) or neodymium (Nd). Suitable quadrivalent cations include zirconium (Zr) or titanium (Ti). The cationic additives are added in amounts of from about 0.1 to 4.0 atomic percent.

Alternatively, or in addition to the ammonium chloride flux, a flux of boron oxide can be used. This flux is conveniently added to the firing mixture in the form of boric acid.

Although the invention has been discussed in terms of specific embodiments, one skilled in the art will be aware of suitable alternative additives and methods of preparation. These are meant to be included herein and the invention is to be limited only by the scope of the appended claims.

I claim:

1. A long persistence red emitting phosphor comprising a trivalent or quadrivalent ion that acts as a thermal trap in a phosphor comprising a doubly activated alkaline earth phosphate, an alkaline earth magnesium silicate or an alkaline earth magnesium di-silicate activated with europium and manganese.

2. A phosphor according to claim 1 wherein said trivalent ion is dysprosium.

3. A phosphor according to claim 1 wherein said trivalent ion is neodymium.

4. A phosphor according to claim 1 wherein said quadrivalent ion is titanium.

5. A phosphor according to claim 1 wherein said quadrivalent ion is zirconium.

6. A phosphor according to claim 1 wherein said phosphor is selected from the group consisting of $Sr_2P_2O_7$:Eu:Mn:Dy; $Ba_3MgSi_2O_8$:Eu:Mn:Dy; $(Ba,Sr,Ca)_3MgSi_2O_8$:Eu:Mn:Nd and $(Sr,Ba)MgSiO_4$:Eu:Mn:Dy.

7. A red emitting long persistence phosphor comprising $Sr_{2.86}Eu_{0.04}Mn_{0.10}MgSi_2O_8$ activated with a trivalent cation or a quadrivalent cation.

\* \* \* \* \*